United States Patent [19]
Kamei et al.

[11] Patent Number: 5,562,308
[45] Date of Patent: Oct. 8, 1996

[54] SUBFRAME STRUCTURE IN MOTOR VEHICLE

[75] Inventors: Takahiro Kamei; Shinji Hinosawa, both of Wako, Japan

[73] Assignee: Honda Giken Kogyo Kabushiki Kaisha, Tokyo, Japan

[21] Appl. No.: 514,828

[22] Filed: Aug. 14, 1995

[30] Foreign Application Priority Data

Aug. 18, 1994 [JP] Japan .................................. 6-194358
Aug. 18, 1994 [JP] Japan .................................. 6-194359

[51] Int. Cl.⁶ ............................................ B62D 7/22
[52] U.S. Cl. ............................................ 280/788; 180/377
[58] Field of Search ............................ 280/788; 180/377

[56] References Cited

U.S. PATENT DOCUMENTS

| | | | |
|---|---|---|---|
| 4,826,203 | 5/1989 | Kijima et al. | 280/690 |
| 4,830,396 | 5/1989 | Gandiglio | 280/701 |
| 5,012,885 | 5/1991 | Hilden | 180/254 |
| 5,244,053 | 9/1993 | Kashiwagi | 180/377 |

FOREIGN PATENT DOCUMENTS

5-193519  8/1993  Japan .

*Primary Examiner*—Kenneth R. Rice
*Attorney, Agent, or Firm*—Armstrong, Westerman, Hattori, McLeland & Naughton

[57] ABSTRACT

A subframe supporting a fuel tank in an internal space therein includes a pair of front and rear cross-members extending in a lateral direction of a vehicle body, a pair of left and right upper side-members and a pair of left and right lower side-members which extend in a longitudinal direction of the vehicle body to interconnect left and right opposite ends of the cross-members, respectively. Longitudinally intermediate portions of the adjacent upper and lower side-members are integrally coupled to each other by a vertically extending bracket. An upper arm is pivotally supported at an upper end of the bracket, and a lower arm is pivotally supported at a lower end of the bracket. The above construction makes it possible to increase the rigidity of the subframe, while providing an effective utilization of the internal space in the subframe.

7 Claims, 9 Drawing Sheets

SUBFRAME STRUCTURE IN MOTOR VEHICLE

BACKGROUND OF THE INVENTION

1. Field of the Invention

The present invention relates to a motor vehicle including a subframe mounted on a vehicle body frame, and left and right suspensions supported on the subframe, and particularly, to a structure of such a subframe.

2. Description of the Prior Art

There is such a conventionally known subframe structure described in Japanese Patent Application Laid-open No. 193519/93.

This subframe includes two front and rear members coupled to each other into a hollow frame-like configuration by bolts, and a plurality of brackets mounted on left and right opposite sides thereof for supporting suspension arms.

Such a known subframe has the following problem:

A load from a rear wheel is transmitted through the suspension arm to the subframe which supports the suspension. Therefore, if the subframe does not have enough rigidity to withstand such a load, the performance of the suspension is not sufficiently exhibited. However, it can not be said that the above known subframe has sufficient rigidity, because it is formed into a mere hollow frame-like configuration.

In order to reinforce the subframe, it seems a good idea to interconnect, by cross-members, longitudinally intermediate portions of left and right side-members constituting the subframe. However, such a construction is accompanied by a disadvantage in that the cross-members become obstacles in mounting a fuel tank or the like in an internal space in the subframe.

The above known subframe also has another problem in that the bracket are mounted in correspondence to the suspension arms and hence, a large number of the brackets are required, resulting not only in an increased number of parts and an increased number of assembling steps, but also in a difficulty for providing a positional accuracy between points for supporting the suspensions.

SUMMARY OF THE INVENTION

Accordingly, it is a first object of the present invention to enhance the rigidity of the subframe, while enabling the internal space in the subframe to be effectively utilized.

It is also a second object of the present invention to support the suspension arms firmly and with a good accuracy without bringing about increases in parts and assembling steps.

To achieve the first object, according to the present invention, there is provided a subframe structure in a motor vehicle including a subframe mounted on a vehicle body frame, and left and right suspensions supported on the subframe, the subframe structure comprising side-members which are mounted on left and right opposite sides of the subframe and which are comprised of an upper side-member and a lower side-member extending in a longitudinal direction and vertically spaced apart from each other, longitudinally intermediate portions of the side-members being integrally coupled to each other by a connecting member, and suspension arms supported in the vicinity of joints between the side-members and the connecting member.

With the above construction, even if the longitudinally intermediate portions of the left and right side-members are not connected to each other by cross-members, it is possible to sufficiently insure the rigidity of the subframe and moreover, to effectively utilize the internal space in the subframe for mounting the fuel tank or the like. In addition, it is possible to receive the load transmitted from the arm by a higher-rigidity portion of the subframe, thereby providing a reduction in weight of the subframe.

In this case, if the suspension arms are supported on the connecting member, the load transmitted from the arms to the connecting member can be dispersed to both of the upper and lower side-members.

To achieve the second object, according to the present invention, there is provided a subframe structure in a motor vehicle including a subframe mounted on a vehicle body frame, and left and right suspensions supported on the subframe, the subframe structure comprising, side-members mounted on left and right opposite sides of the subframe, and extending in a longitudinal direction of the motor vehicle; a vertically extending bracket mounted on each of the side-members; and an upper arm and a lower arm of the suspension which are supported on upper and lower ends of the bracket.

With the above construction, the bracket can be commonly used for the upper and lower arms to reduce the numbers of parts and assembling steps and moreover, the rigidity of the bracket itself can be enhanced, not only to firmly support the suspension, but also to enhance the positional accuracy between points for supporting the upper and lower arms.

In this case, if the side-members are upper and lower side-members which are spaced apart from each other and integrally connected to each other by the bracket, the rigidity of the side-members and the rigidity of the bracket are enhanced, thereby making it possible to further firmly support the suspension to sufficiently exhibit the performance of the suspension.

The above and other objects, features and advantages of the invention will become apparent from the following description of preferred embodiments taken in conjunction with the accompanying drawings.

DESCRIPTION OF THE PREFERRED EMBODIMENTS

A first embodiment of the present invention will now be described with reference to FIGS. 1 to 7.

Figure 1:
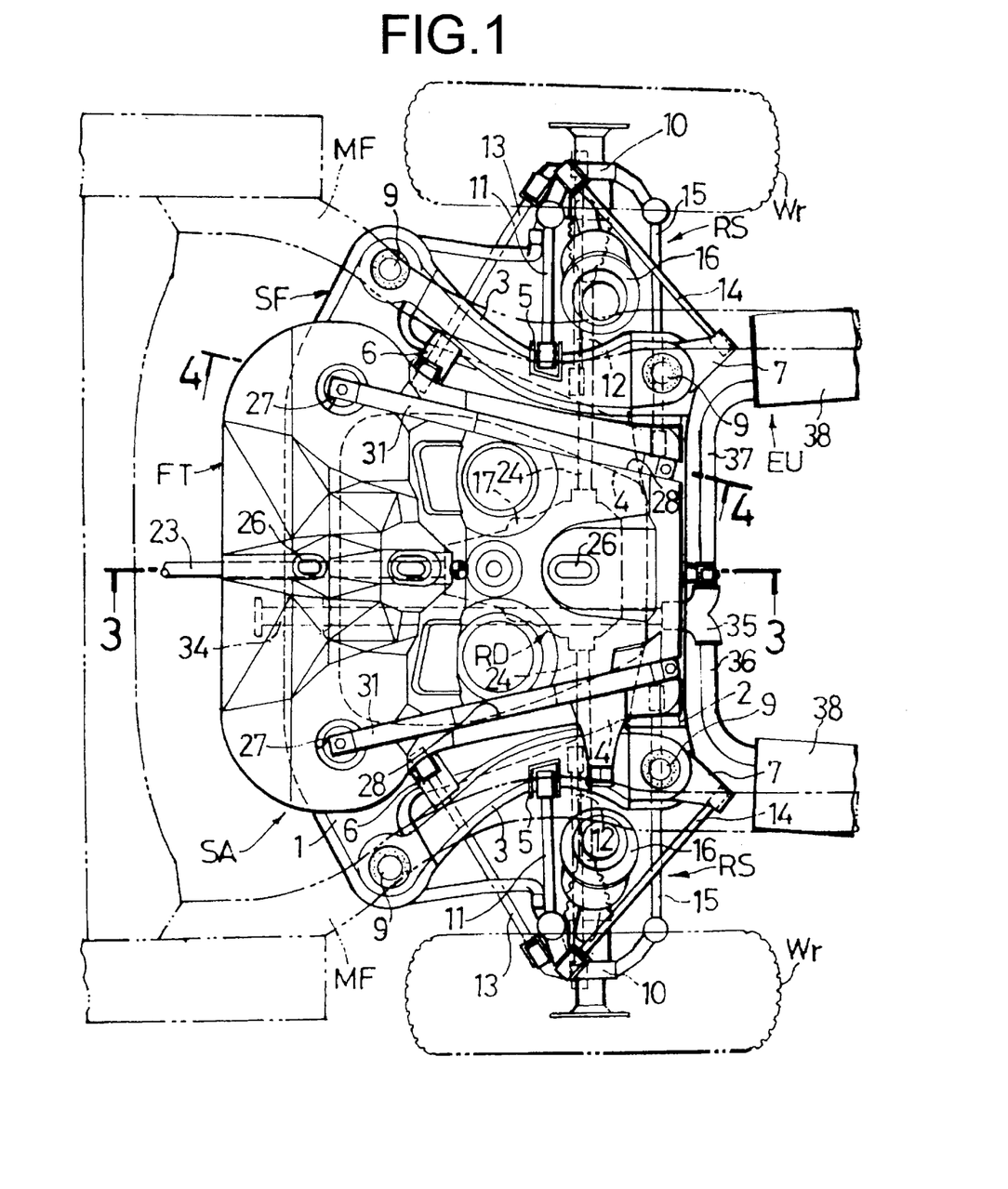
FIG. 1 is a plan view of a subframe assembly according to a first embodiment of the present invention.
Figure 2:
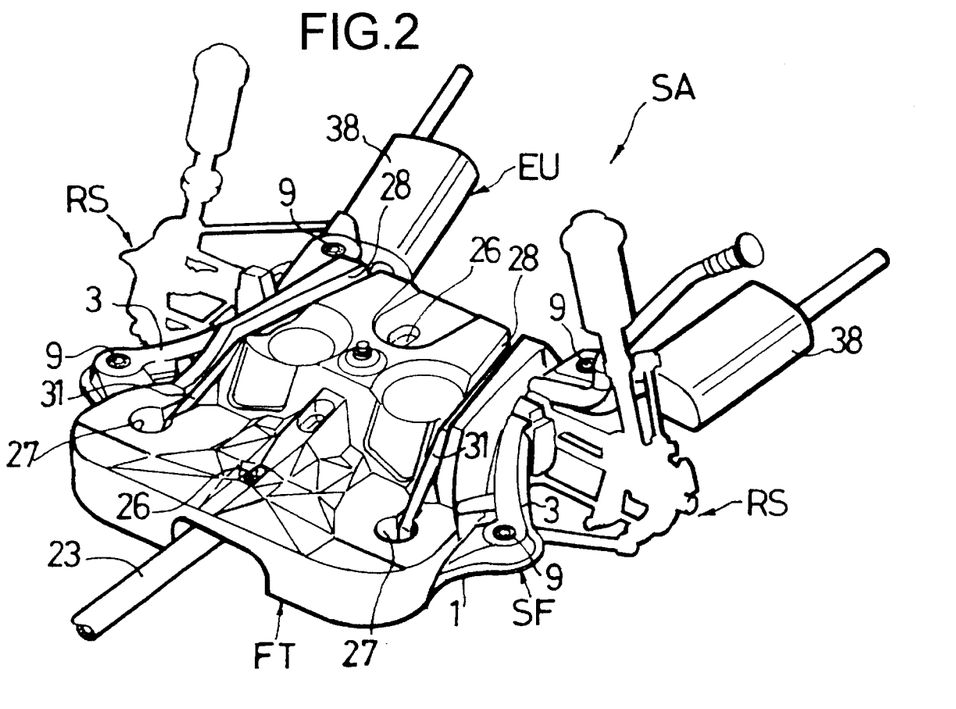
FIG. 2 is a perspective view of the subframe assembly.

Referring to FIGS. 1 and 2, a subframe assembly SA is supported on a pair of left and right vehicle body frames MF, MF extending in a longitudinal direction at a rear portion of a vehicle body. The subframe assembly SA is formed by integrally assembling a framework-like subframe SF having a substantially rectangular shape as viewed in a plane, a fuel tank FT, a pair of left and right rear suspensions RS, RS for supporting left and right rear wheels Wr, Wr, a rear differential RD and an exhaust unit EU. The subframe assembly SA is previously subassembled in an assembling line separate from a vehicle body assembling line and is then mounted on vehicle body frames MF, MF of a vehicle body moving on the vehicle body assembling line.

Figure 6:
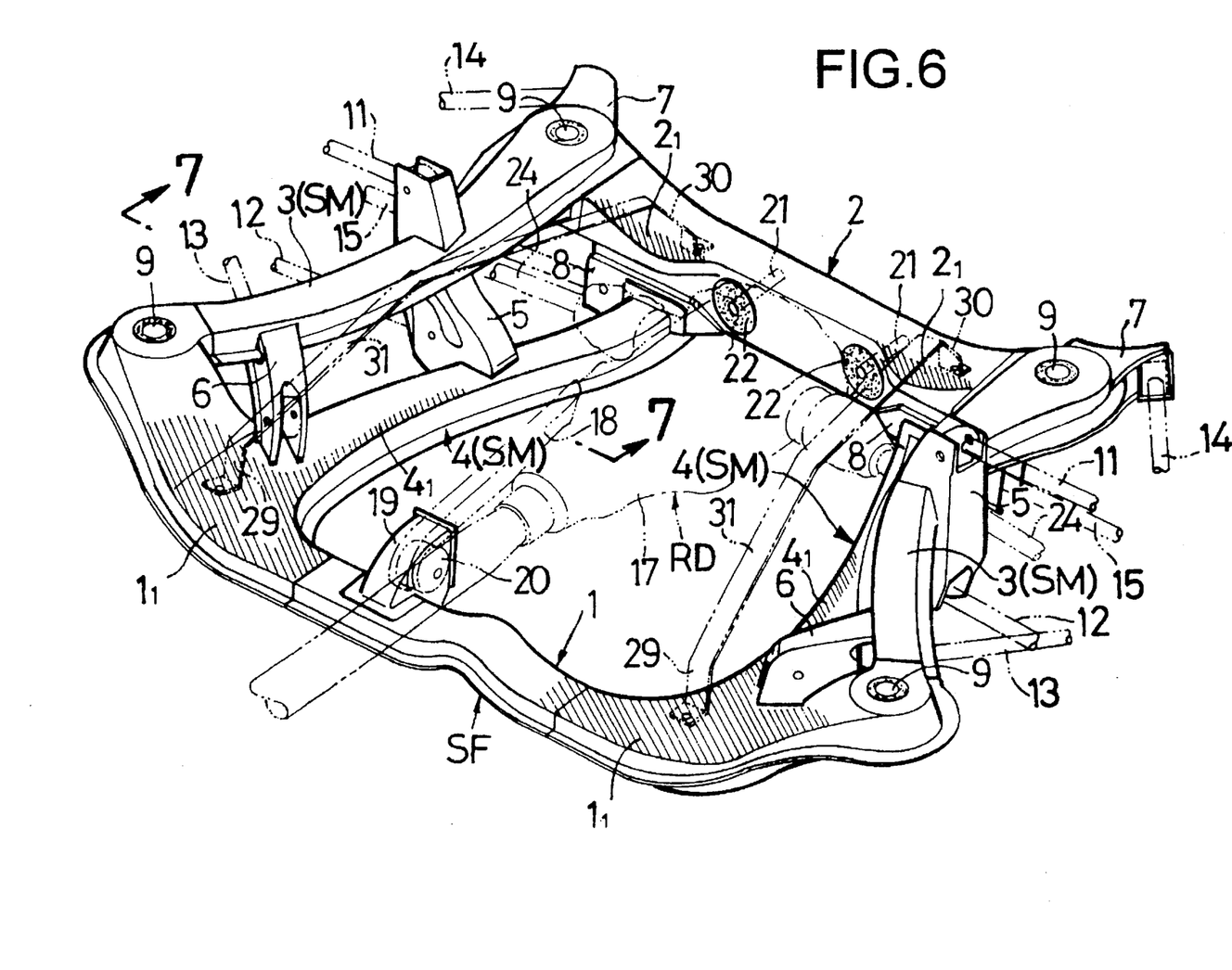
FIG. 6 is a perspective view of a subframe.
Figure 7:
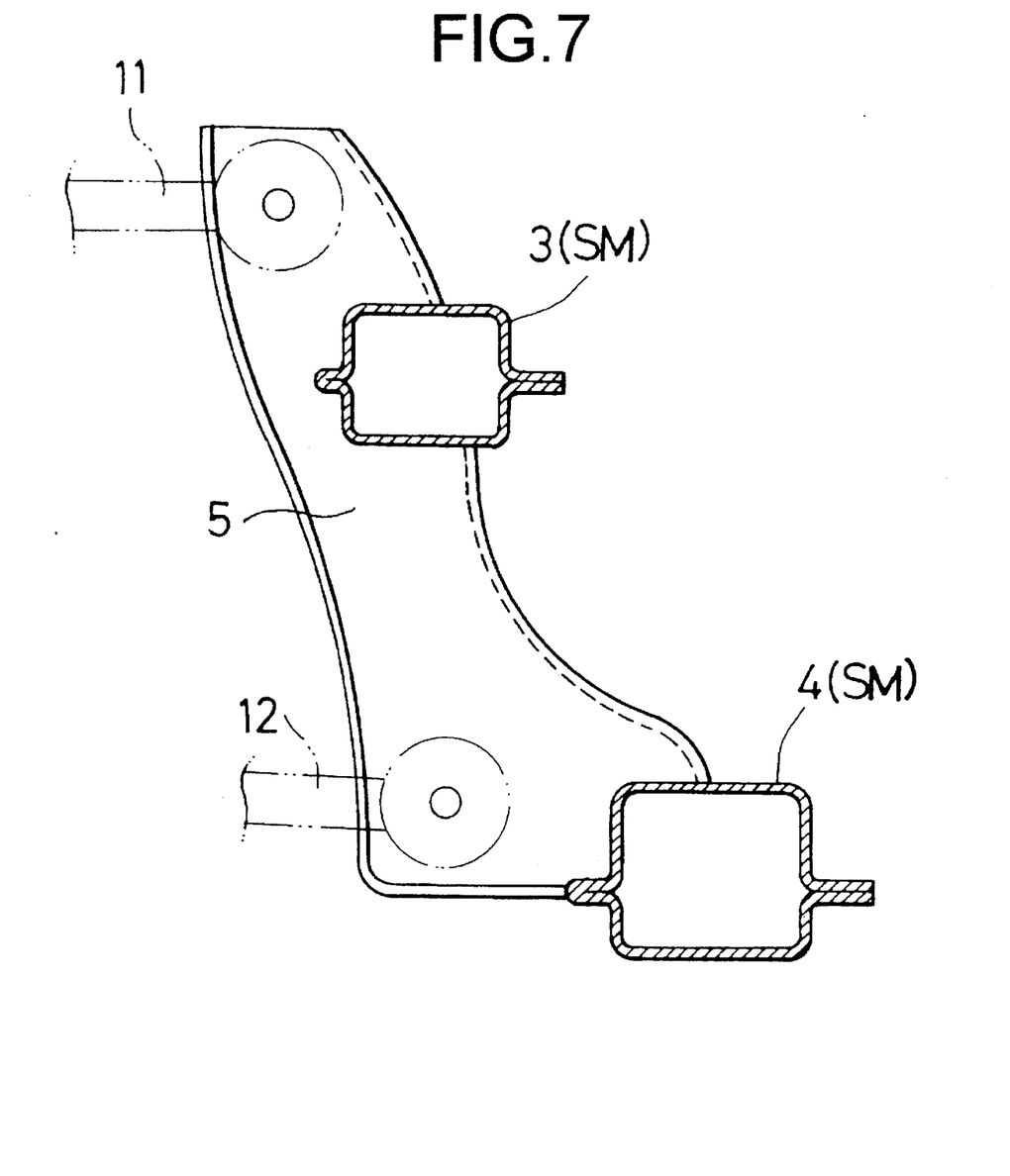
FIG. 7 is an enlarged sectional view taken along a line 7—7 in FIG. 6.

As shown in FIGS. 6 and 7, the subframes SF includes a front cross-member 1 extending in a lateral direction of the vehicle body, a rear cross-member 2 extending in the lateral direction of the vehicle body to the rear of the front cross-member 1, a pair of left and right upper side-members 3, 3 extending in the longitudinal direction of the vehicle body to interconnect the left and right opposite ends of both the cross-members 1 and 2. Also a pair of left and right lower side-members 4, 4 extend in the longitudinal direction of the vehicle body to interconnect both cross-members 1 and 2 below the upper side-members 3, 3 and inside the vehicle body. Each front cross-member 1, rear cross-member 2, upper side-members 3, 3 and lower side-members 4, 4 includes a box section having a high rigidity. The upper side member 3 and the lower side-member 4 together forming a pair, constitute a side-member SM of the present invention.

The upper side-members 3, 3 are located at a level higher than that of the lower side-members 4, 4, and the side-members 3, 3 and 4, 4 are interconnected at their intermediate portions in the longitudinal direction of the vehicle body by first vertically extending brackets 5, 5. The first brackets 5, 5 constituting a connecting member of the present invention are welded at their lower portions to outer sides and upper surfaces of the lower side-members 4, 4 and at their intermediate portions to outer sides and upper and lower surfaces of the upper side-members 3, 3. Upper portions of the first brackets 5, 5 extend above the upper side-members 3, 3.

The front cross-member 1 is connected with the left and right upper side-members 3, 3 by a pair of second brackets 6, 6, respectively. A pair of third brackets 7, 7 are mounted at rear ends of the left and right upper side-members 3, 3 and a pair of fourth brackets 8, 8 are mounted on a lower surface of the rear cross-member 2.

Four rubber bush mounts 9 for resiliently supporting the subframe SF on the vehicle body frames MF, MF are provided at four corners of the subframe SF, i.e., at joints between the front and rear cross-members 1 and 2 and the left and right upper side-members 3, 3.

As can be seen from FIGS. 1, 6 and 7, each of the rear suspensions RS is of a multi-link type, and includes a knuckle 10 for rotatably supporting the rear wheel Wr, an upper arm 11 for connecting the knuckle 10 to an upper end of the first bracket 5, a lower arm 12 for connecting the knuckle 10 to a lower end of the first bracket 5, a trailing arm 13 for connecting the knuckle 10 to the second bracket 6, a leading arm 14 for connecting the knuckle 10 to the third bracket 7, a control arm 15 for connecting the knuckle 10 to the fourth bracket 8, and a damper 16 for connecting the knuckle 10 to the vehicle body.

Since the longitudinally intermediate portions of the upper and lower side-members 3, 3 and 4, 4 are interconnected by the brackets 5, 5, as described above, the subframe SF has a tremendously increased rigidity in the vicinity of the brackets 5, 5 and at the same time, the rigidity of the brackets 5, 5 themselves is also increased. Since the upper arms 11, 11 and the lower arms 12, 12 are supported at the upper and lower ends of the high-rigidity brackets 5, 5, the load from the rear wheels Wr, Wr can be dispersed to and received by the upper and lower side-members 3, 3 and 4, 4, but also the lateral rigidity and the camber rigidity of the rear suspensions RS, RS are enhanced and moreover, the positional accuracy between the upper and lower arms 11, 11 and 12, 12 is enhanced. Further, the number of parts or components and the number of welding steps can be reduced to provide a reduction in cost, as compared with the case where the brackets for the upper arms 11, 11 and the brackets for the lower arms 12, 12 are separately welded.

Figure 3:
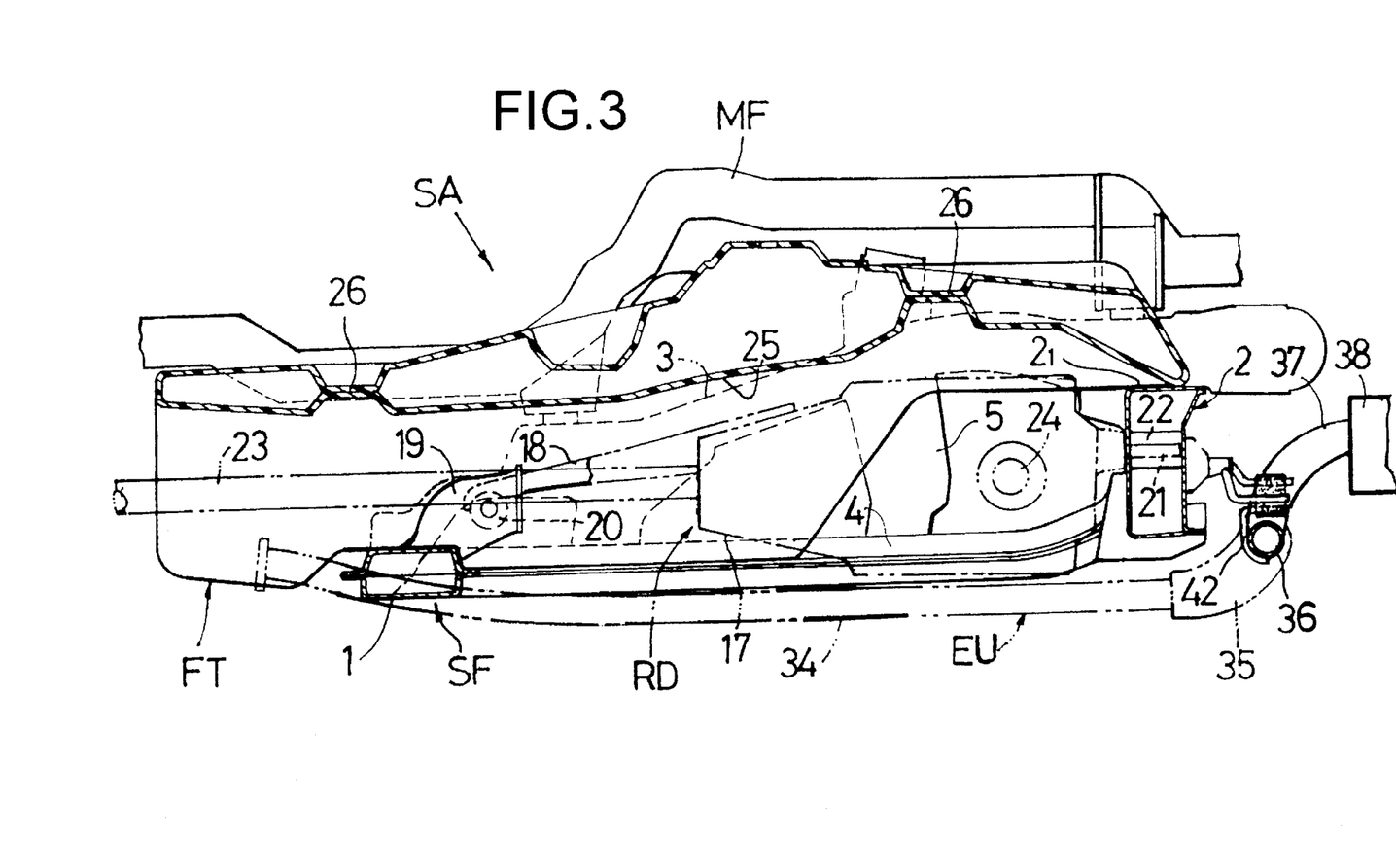
FIG. 3 is an enlarged sectional view taken along a line 3—3 in FIG. 1.

As can be seen from FIGS. 3 and 6, the rear differential RD includes a support arm 18 extending forwardly from a differential case 17. The support arm 18 is resiliently supported at its front end on a rubber bush 20 which is mounted on a bracket 19 projectingly mounted on an upper surface of the front cross-member 1 of the subframe SF. On the other hand, a pair of left and right pins 21, 21 extending rearwardly from the differential case 17 are fitted into and resiliently supported in a pair of left and right rubber bushes 22, 22 mounted on the rear cross-member 2 of the subframe SF.

A propeller shaft 23 extends forwardly from the differential case 17 to pass above the front cross member 1. Axles 24, 24 extend leftwardly and rightwardly from the differential case 17 to pass through the knuckles 10, 10, respectively and are connected to the rear wheels Wr, Wr.

As can be seen from FIGS. 1 to 4, the fuel tank FT is formed by a blow-molding from a synthetic resin, and has a longitudinally extending tunnel 25 provided in a recessed manner in a lower surface thereof, in order to accommodate the rear differential RD. The rear differential RD is disposed at a rear portion of the tunnel 25, i.e., at a location closer to the rear cross-member 2 inside the subframe SF. The thickness of the fuel tank FT is smaller in an area above the tunnel 25, and two welds 26, 26 (see FIG. 3), by which upper and lower walls of the fuel tank FT are bonded, are formed at such area.

Figure 4:
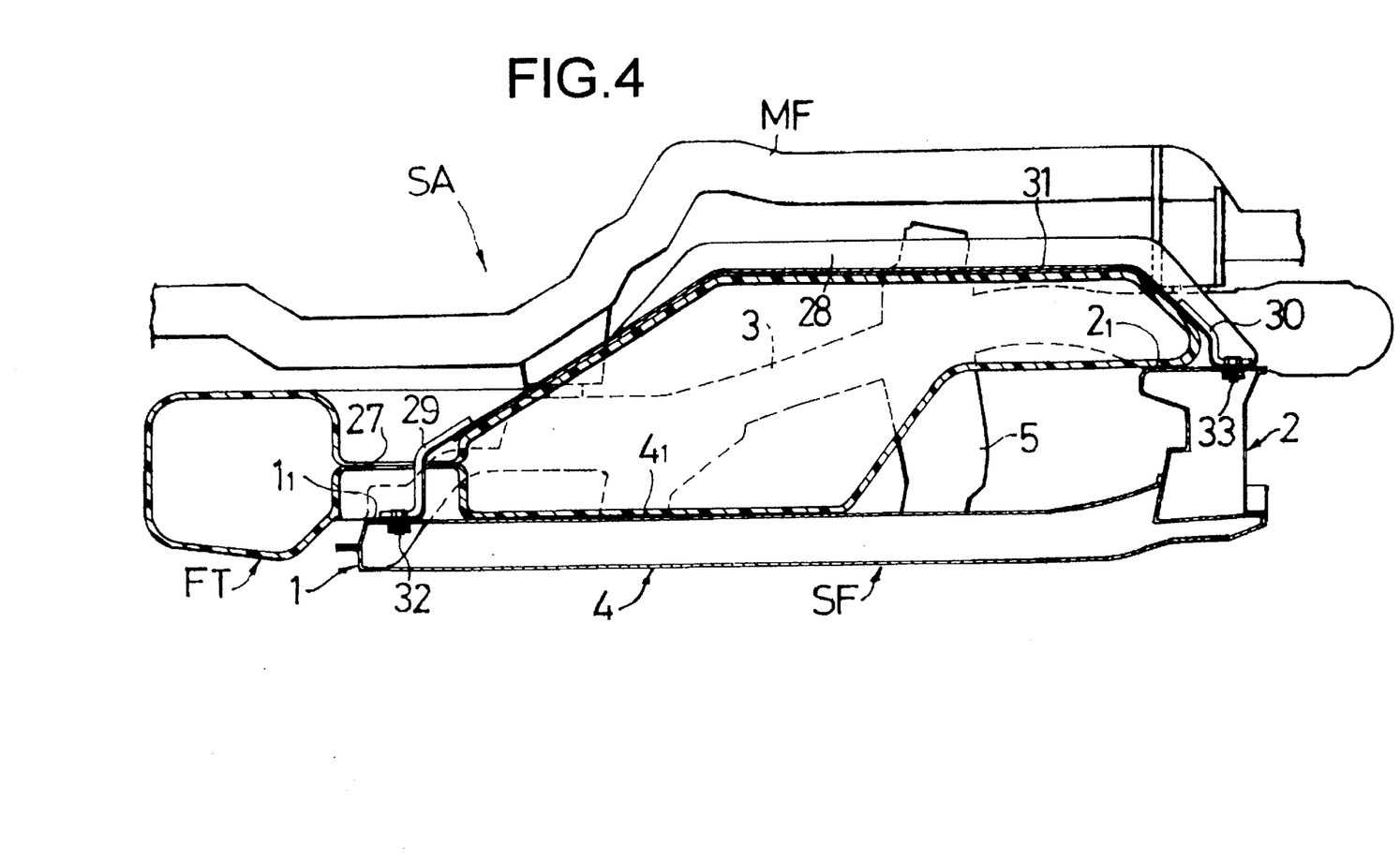
FIG. 4 is an enlarged sectional view taken along a line 4—4 in FIG. 1.

The fuel tank FT has a front portion which overhangs more forwardly than the front cross-member 1 (see FIGS. 3 and 4). Thus, a portion of the volume of the fuel tank FT reduced by the tunnel 25 is compensated and hence, the volume of the fuel tank FT as a whole can be sufficiently insured.

A pair of band holes 27, 27 are defined in left and right front portions of the fuel tank FT to vertically pass therethrough, and two band grooves 28, 28 extend rearwardly from the band holes 27, 27 to a rear end of the fuel tank FT. The rear portion of the fuel tank FT is placed on a pair of left and right tank abutments $2_1$, $2_1$ (see obliquely lined portions in FIG. 6) formed on left and right upper surface portions of the rear cross-member 2, and the front portion of the fuel tank FT is placed on a pair of left and right tank abutments $1_1$, $4_1$; $1_1$, $4_1$ (see obliquely lined portions in FIG. 6) formed on upper surfaces of the front cross-member 1 and the left and right inner side-members 4, 4.

Figure 5:
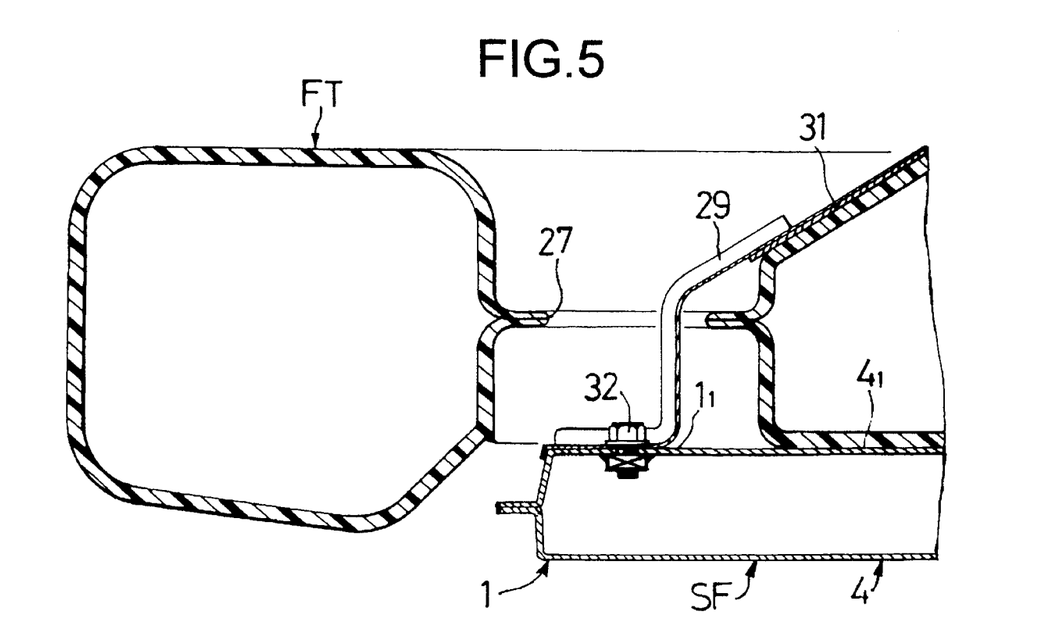
FIG. 5 is an enlarged view of an essential portion shown in FIG. 4.

As can be seen from FIGS. 2, 4 and 5, two fuel tank fixing bands 31, 31 are fitted in the band grooves 28, 28 and each have a front mounting portion 29 and a rear mounting portion 30 at front and rear opposite ends thereof. The fixing bands 31, 31 are fixed at their front mounting portions 30, 30 on the upper surface of the front cross-member 1 by bolts 32, 32 and at their rear mounting portions 31, 31 on the upper surface of the rear cross-member 2 by bolts 33, 33 to pass through the band holes 27, 27.

In this way, the pair of fuel tank abutments $2_1$, $2_1$ for supporting the lower surface of the rear portion of the fuel tank FT are formed on the firm rear cross-member 2 for supporting most of the load of the rear differential RD, and the two fuel tank fixing bands 31, 31 for fixing the fuel tank FT are fixed to the rear cross-member 2 in the vicinity of the fuel tank abutments $2_1$, $2_1$. Therefore, it is possible not only to firmly retain the fuel tank FT, but also a special member for supporting the fuel tank FT is not required, which is convenient in respects of both cost and weight.

In addition, since the fuel tank fixing bands 31, 31 are fixed to the subframe SF to pass through the band holes 27, 27, it is possible to establish any shape of the fuel tank FT irrespective of the shape of subframe SF. Thus, it is possible not only to provide an increase in volume of the fuel tank FT, but also to determine the mounting points of the fuel tank fixing bands 31, 31 to the subframe SF at any points. Additionally, the length of the fuel tank fixing bands 31, 31 can be reduced depending upon the band holes 27, 27 and hence, it is possible to reduce the weight and to facilitate the mounting operation. Moreover, since the fuel tank fixing bands 31, 31 are positioned by the band holes 27, 27 and the band grooves 28, 28, it is possible to reliably prevent the misalignment of the fuel tank FT.

As can be seen from FIG. 1, the exhaust unit EU includes a front exhaust pipe 34 extending in the longitudinal direction of the vehicle body, a left rear exhaust pipe 36 and a right rear exhaust pipe 37 which are connected to a rear end of the front exhaust pipe 34 through a coupling 35 and which diverge laterally from each other, and a pair of left and right silencers 38, 38 connected to rear ends of the rear exhaust pipes 36 and 37, respectively. The front exhaust pipe 34 is accommodated within the tunnel 25 in the fuel tank FT and disposed on the left side of the propeller shaft 24 which is oriented along a center line of the vehicle body.

The silencers 38, 38 of the exhaust unit EU supported in the hung manner on the subframe SF protrude rearwardly of the vehicle body from the rear cross-member 2 of the subframe SF. Therefore, even if the position of the center of gravity of the subframe assembly SA is displaced forwardly due to the forward protrusion of the front portion of the fuel tank FT from the front cross-member 1 of the subframe SF, the position of the center of gravity of the subframe assembly SA can be maintained at a substantially central portion of the subframe SF by an effect of retreating the position of the center of gravity by the weight of the silencers 38, 38 protruding rearwardly of the vehicle body from the rear cross-member 2, in addition to an effect of retreating the position of the center of gravity by the fact that the rear differential RD is disposed rearwardly to lie in proximity to the rear cross-member 2.

As a result, in previously subassembling the subframe assembly SA in the assembling line separate from the vehicle body assembling line, the attitude of the subframe assembly SA on a pallet can be stabilized to enhance the working efficiency. When the subframe assembly SA has been mounted on the vehicle body framed MF, MF of the vehicle body moving on the vehicle body assembling line, the position of the center of gravity thereof is located at substantially the central portion of the subframe SF (see FIG. 1). Therefore, it is possible to substantially uniformly distribute the load applied to the four rubber bush mounts 9 to sufficiently exhibit a vibration-proofing function, and moreover to reduce the cost by the common use of the four rubber bush mounts 9.

Figure 8:
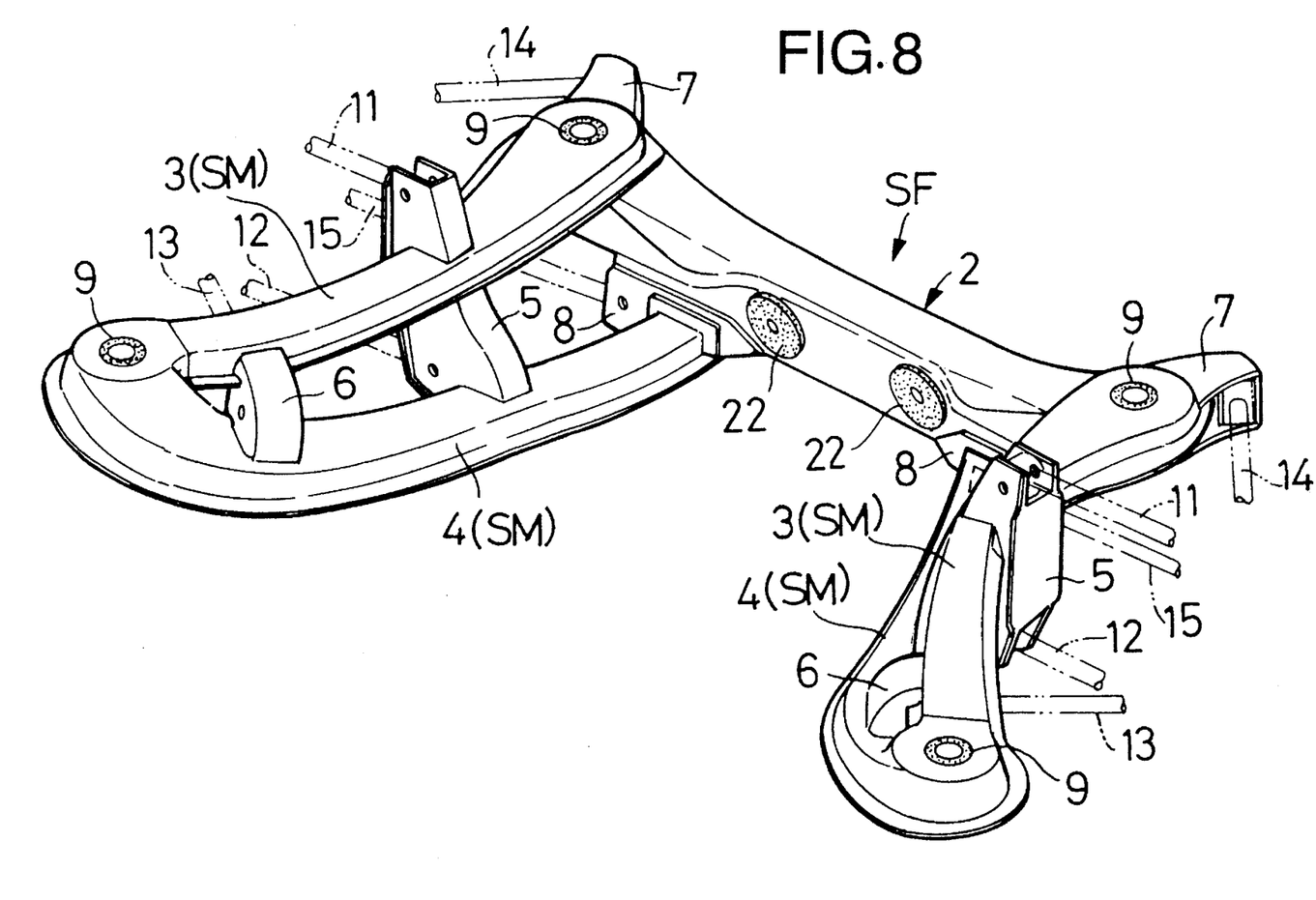
FIG. 8 is a perspective view of a sub frame according to a second embodiment of the present invention.

A second embodiment of the present invention will now be described with reference to FIG. 8.

A subframe SF in the second embodiment has no front cross-member 1, and tip ends of upper side-members 3, 3 extending forwardly from left and right opposite ends of a rear cross-member 2 are integrally coupled to tip ends of lower side-members 4, 4. Longitudinally intermediate portions of the upper side-members 3, 3 and longitudinally intermediate portions of the lower side-members 4, 4 are integrally coupled to each other by first brackets 5, 5 for supporting upper arms 11, 11 and lower arms 12, 12.

Thus, even in the second embodiment, an operational effect similar to that in the first embodiment can be provided and moreover, the utilization of an internal space in the subframe SF is further facilitated by the fact that the front cross-member 1 is not used.

Figure 9:
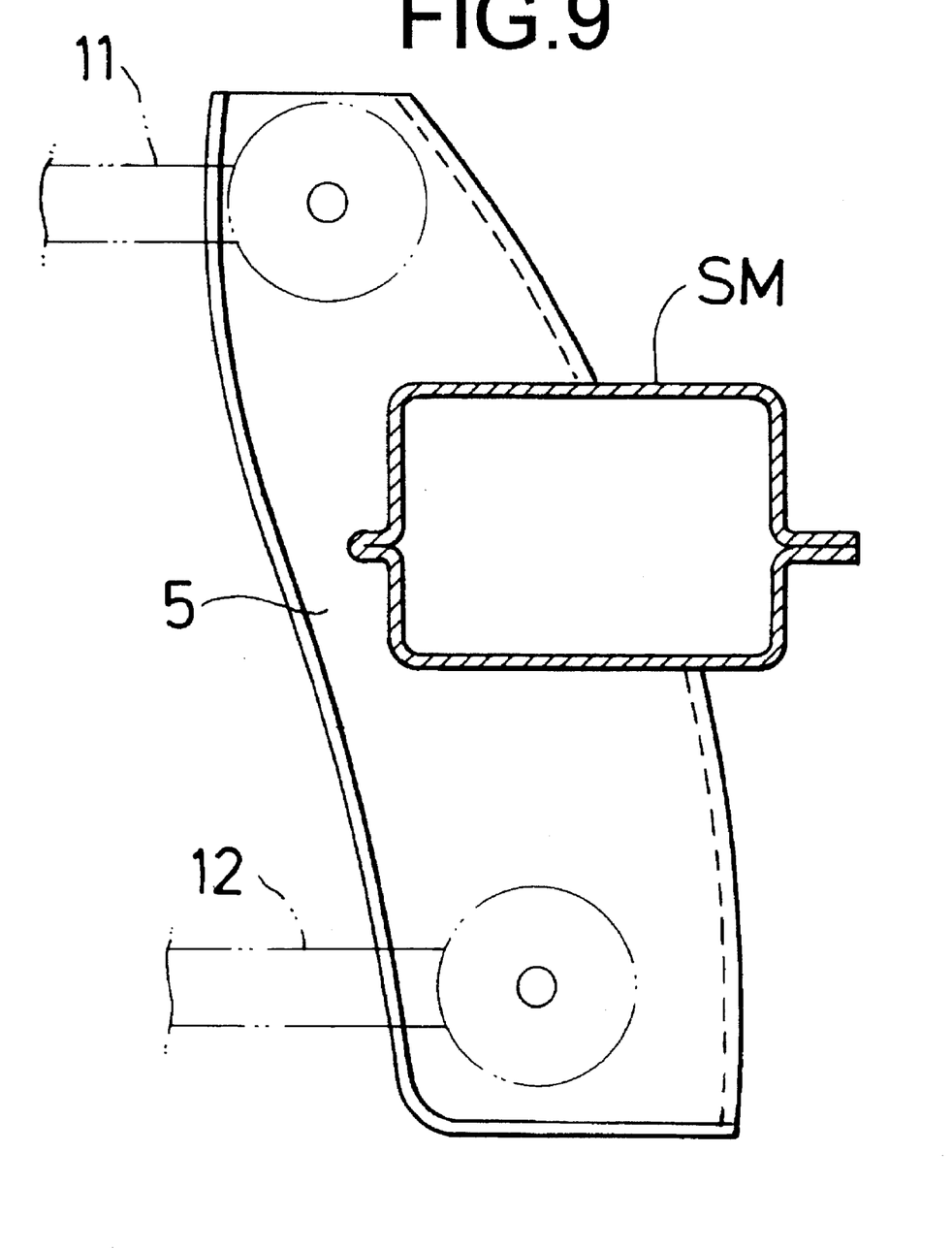
FIG. 9 is a view similar to FIG. 7, but illustrating a third embodiment of the present invention.

A third embodiment of the present invention will be described below with reference to FIG. 9.

A subframe SF in the third embodiment includes a single side member SM on each of left and right opposite sides thereof. Upper arms 11, 11 and lower arms 12, 12 are pivotally supported respectively at upper and lower ends of first brackets 5, 5 which are welded to outer sides and upper and lower surfaces of the side-members SM, SM at their longitudinally intermediate portions.

Thus, even in the third embodiment, an operational effect similar to that in the first embodiment can be provided. However, the rigidity of each of the side-members SM, SM and the first brackets 5, 5 is slightly reduced, as compared with that in the first embodiment.

Although the embodiments of the present invention have been described in detail, it will be understood that the present invention is not limited to the above-described embodiments, and various modifications may be made without departing from the spirit and scope of the invention defined in claims.

For example, although the upper arm 11 and the lower arm 12 are supported directly on the bracket 5 in the embodiments, the upper arm 11 and the lower arm 12 or the other suspension can be supported on the upper side-member 3 or the lower side-member 4 in the vicinity of the bracket 5. In addition, although the front cross-member 1 is not used in the second embodiment, the rear cross-member 2 may not be used, and the rear ends of the upper side-members 3, 3 may be integrally coupled to the rear ends of the lower side-members 4, 4.

We claim:

1. A subframe structure in a motor vehicle including a subframe mounted on a vehicle body frame, and left and right suspensions supported on the subframe, said subframe structure comprising:

side-members mounted on left and right opposite sides of the subframe, each of said side-members including,
 a) an upper side-member extending in a longitudinal direction of the motor vehicle,
 b) a lower side-member also extending in the longitudinal direction of the motor vehicle and vertically spaced apart from said upper side-member, and
 c) a connecting member integrally coupling longitudinally intermediate portions of said upper and lower side-members together; and suspension arms supported near joints between said upper and lower side-members and said connecting member.

2. A subframe structure in a motor vehicle according to claim 1, wherein said suspension arms are supported on said connecting member.

3. A subframe structure in a motor vehicle according to claim 1, wherein said side-members include a second connecting member coupling said upper and lower side-members together.

4. A subframe structure in a motor vehicle according to claim 3, wherein at least one suspension arm is supported on said second connecting member.

5. A subframe structure in a motor vehicle including a subframe mounted on a vehicle body frame, and left and right suspensions supported on the subframe, said subframe structure comprising:

side-members mounted on left and right opposite sides of the subframe, and extending in a longitudinal direction of the motor vehicle;

a vertically extending bracket mounted on each of said side-members; and an upper arm and a lower arm of the suspension respectively supported on upper and lower ends of said bracket.

6. A subframe structure in a motor vehicle according to claim 5, wherein said side-members are comprised of upper and lower side-members which are spaced apart from each other and integrally connected to each other by said bracket.

7. A subframe structure in a motor vehicle according to claim 5, further comprising a second bracket mounted on each of said side-members.

\* \* \* \* \*